US010419357B1

(12) United States Patent
Bhatta et al.

(10) Patent No.: US 10,419,357 B1
(45) Date of Patent: Sep. 17, 2019

(54) SYSTEMS AND METHODS FOR SUPPORTING PATH MAXIMUM TRANSMISSION UNIT DISCOVERY BY MAINTAINING METADATA INTEGRITY ACROSS PROPRIETARY AND NATIVE NETWORK STACKS WITHIN NETWORK DEVICES

(71) Applicant: Juniper Networks, Inc., Sunnyvale, CA (US)

(72) Inventors: Pranavadatta Devaki Narasimha Bhatta, Mysore (IN); Vivek Ramesh, Kottayam (IN); Reji Thomas, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 15/829,894

(22) Filed: Dec. 2, 2017

(51) Int. Cl.
*H04L 12/805* (2013.01)
*H04L 12/741* (2013.01)
*H04L 29/06* (2006.01)

(52) U.S. Cl.
CPC .......... *H04L 47/365* (2013.01); *H04L 45/74* (2013.01); *H04L 69/22* (2013.01)

(58) Field of Classification Search
CPC ........ H04L 47/365; H04L 45/74; H04L 69/22
See application file for complete search history.

(56) References Cited

U.S. PATENT DOCUMENTS

| 9,935,887 B1* | 4/2018 | Maharia | ............... H04L 47/365 |
| 2008/0298376 A1* | 12/2008 | Takeda | .................... H04L 43/50 370/400 |
| 2015/0071067 A1* | 3/2015 | Martin | ............... G06F 11/2002 370/235 |

* cited by examiner

Primary Examiner — Kashif Siddiqui
(74) Attorney, Agent, or Firm — FisherBroyles, LLP

(57) ABSTRACT

A disclosed method may include (1) providing a network stack that includes both a native stack and a proprietary stack, (2) implementing at least one socket that represents an endpoint of a communication channel between a network device and a computing device, (3) identifying at least one packet to be forwarded from the network device to the computing device via the socket, (4) configuring the network stack such that (A) the native stack discovers a maximum transmission unit of a network path between the network device and the computing device in connection with the socket and (B) the proprietary stack fragments the packet into a plurality of segments that each comply with the maximum transmission unit of the network path, and then (5) forwarding, along the network path, the segments to the computing device. Various other systems and methods are also disclosed.

16 Claims, 8 Drawing Sheets

SYSTEMS AND METHODS FOR SUPPORTING PATH MAXIMUM TRANSMISSION UNIT DISCOVERY BY MAINTAINING METADATA INTEGRITY ACROSS PROPRIETARY AND NATIVE NETWORK STACKS WITHIN NETWORK DEVICES

BACKGROUND

Network devices (such as routers and switches) are often used to forward traffic within a network and/or across networks. In some examples, a network device may employ an operating system that includes a network stack responsible for certain networking tasks involved in forwarding traffic. This network stack may be native to the operating system employed by the network device. Such networking tasks may include Path Minimum Transmission Unit (PMTU) discovery, packet routing, transport-layer functions, PMTU compliance, and/or packet fragmentation.

In some examples, the manufacturer of the network device may build another network stack on and/or over the network stack that is native to the operating system. This other network stack may be proprietary to the manufacturer of the network device. By doing so, the manufacturer may effectively customize and/or fine-tune the innerworkings of the network stack to facilitate and/or ensure certain features or functionality when forwarding traffic. In such examples, the manufacturer may program and/or configure the combined network stack such that certain networking tasks (e.g., PMTU discovery, packet routing, transport-layer functions, PMTU compliance, and/or packet fragmentation) are assigned across and/or shared by the proprietary and native stacks. As packets traverse the combined network stack, these packets may move back and forth between the proprietary and native stacks. To enable the proprietary and native stacks to perform their assigned networking tasks, these packets may need to carry certain metadata that is preserved as they move back and forth.

Unfortunately, traditional configurations of such a combined network stack may lead to the loss of important metadata as traffic traverses and/or is passed from the native stack to the proprietary stack. For example, in a traditional configuration, the native stack may attempt to fragment an outgoing packet into PMTU-compliant segments prior to passing the packet to the proprietary stack. In this traditional configuration, various problematic issues may arise. First, the native stack may be unable to ensure that the packet's metadata is copied to each of the resulting PMTU-compliant segments, thereby potentially leading to traffic delivery failures. Second, in the event that the native stack is able to copy the packet's metadata to each of the resulting PMTU-compliant segments, this copying process may add a significant resource burden or load (in terms of, e.g., both time and/or memory) to the native stack.

The instant disclosure, therefore, identifies and addresses a need for additional and improved systems and methods for supporting PMTU discovery by maintaining metadata integrity across proprietary and native network stacks within network devices.

SUMMARY

As will be described in greater detail below, the instant disclosure generally relates to systems and methods for supporting PMTU discovery by maintaining metadata integrity across proprietary and native network stacks within network devices. In one example, a method for accomplishing such a task may include (1) providing a network stack that includes both a native stack and a proprietary stack that collectively facilitate forwarding traffic from a network device to at least one computing device, (2) implementing at least one socket that represents an endpoint of a communication channel between the network device and the computing device, (3) identifying at least one packet to be forwarded from the network device to the computing device via the socket, (4) configuring the network stack such that (A) the native stack discovers a maximum transmission unit of a network path between the network device and the computing device in connection with the socket and (B) the proprietary stack fragments the packet into a plurality of segments that each comply with the maximum transmission unit of the network path, and then (5) forwarding, along the network path via the socket, the segments fragmented from the packet to the computing device in compliance with the maximum transmission unit of the network path.

Similarly, a system that implements the above-described method may include various modules that are stored in memory and executed by at least one physical processing device. For example, the system may include (1) a provisioning module that provides a network stack that includes both a native stack and a proprietary stack that collectively facilitate forwarding traffic from a network device to at least one computing device, (2) a socket module that implements at least one socket that represents an endpoint of a communication channel between the network device and the computing device, (3) an identification module that identifies at least one packet to be forwarded from the network device to the computing device via the socket, (4) a configuration module that configures the network stack such that (A) the native stack discovers a maximum transmission unit of a network path between the network device and the computing device in connection with the socket and (B) the proprietary stack fragments the packet into a plurality of segments that each comply with the maximum transmission unit of the network path, and (5) a forwarding module that forwards, along the network path via the socket, the segments fragmented from the packet to the computing device in compliance with the maximum transmission unit of the network path.

In addition, a network device that implements the above-described method may include a storage device that stores a network stack that includes both a native stack and a proprietary stack that collectively facilitate forwarding traffic to at least one computing device. In this example, the network device may also include a physical processing device that is communicatively coupled to the storage device. The physical processing device may (1) implement at least one socket that represents an endpoint of a communication channel to the computing device, (2) identify at least one packet to be forwarded to the computing device via the socket, (3) configure the network stack such that (A) the native stack discovers a maximum transmission unit of a network path to the computing device in connection with the socket and (B) the proprietary stack fragments the packet into a plurality of segments that each comply with the maximum transmission unit of the network path, and then (4) forward, along the network path via the socket, the segments fragmented from the packet to the computing device in compliance with the maximum transmission unit of the network path.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
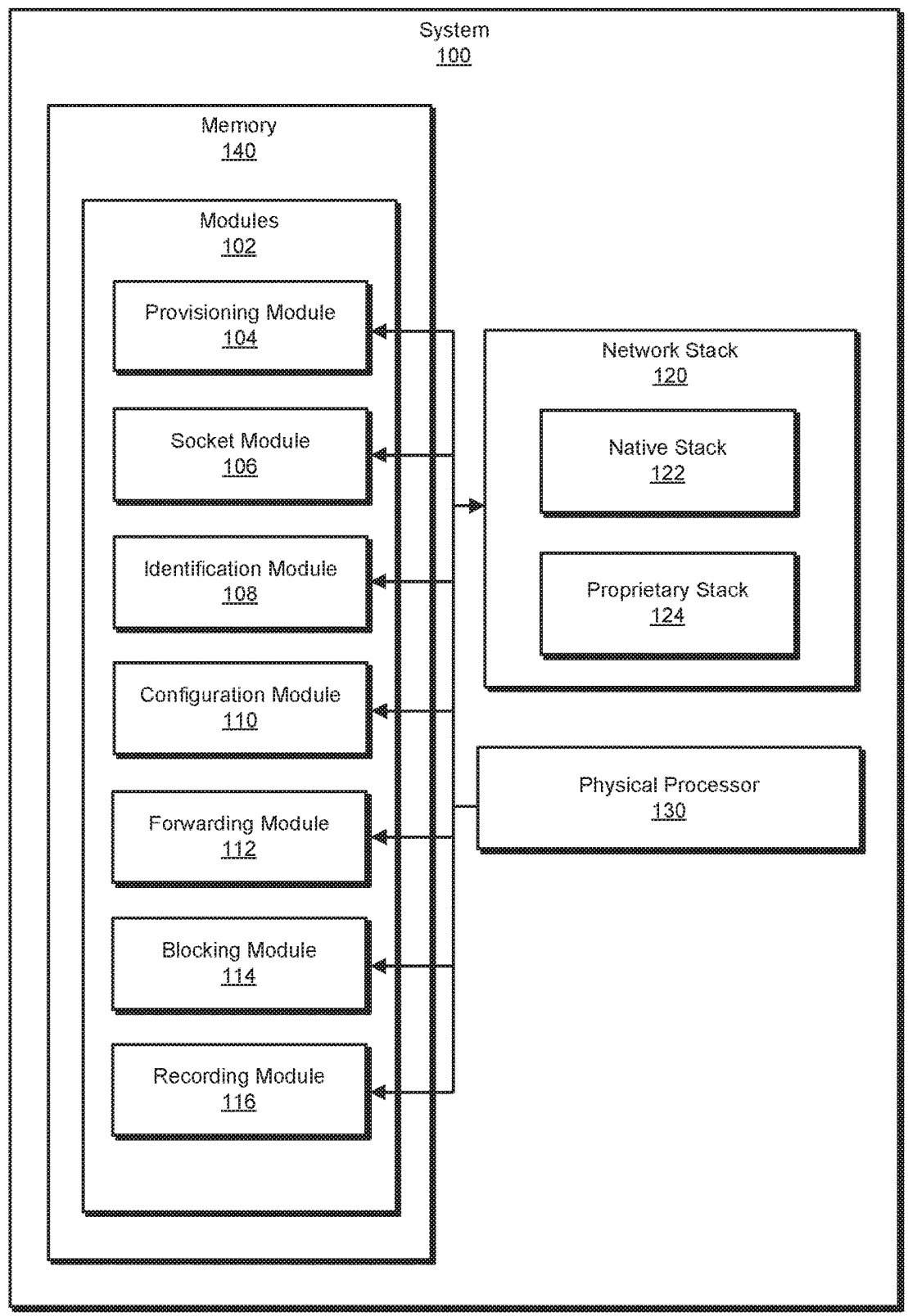
FIG. 1 is a block diagram of an exemplary system for supporting PMTU discovery by maintaining metadata integrity across proprietary and native network stacks within network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for supporting PMTU discovery by maintaining metadata integrity across proprietary and native network stacks within network devices. As will be explained in greater detail below, embodiments of the instant disclosure may provide a network stack that includes both a native stack and a proprietary stack that collectively facilitate forwarding traffic from a network device to another device. These embodiments may preserve the metadata of packets traversing the network stack by preventing the native stack from fragmenting the packets into PMTU-compliant segments. As a result, these embodiments may also ensure that the proprietary stack is able to fragment the packets (if necessary) and/or decide whether to forward and/or drop the packets based at least in part on their respective sizes and the PMTUs of the corresponding network paths.

By doing so, these embodiments may ensure that the metadata of the packets is not lost as the packets traverse from the native stack to the proprietary stack for fragmentation. Moreover, by doing so, these embodiments may improve the efficiency of the network stack over traditional configurations in which the native stack fragments the packets into PMTU-compliant segments and then copies the corresponding metadata to each of those segments. These improvements to the efficiency of the network stack may include and/or involve reducing and/or mitigating the resource burden or load (in terms of, e.g., both time and/or memory) of the native stack.

Figure 2:
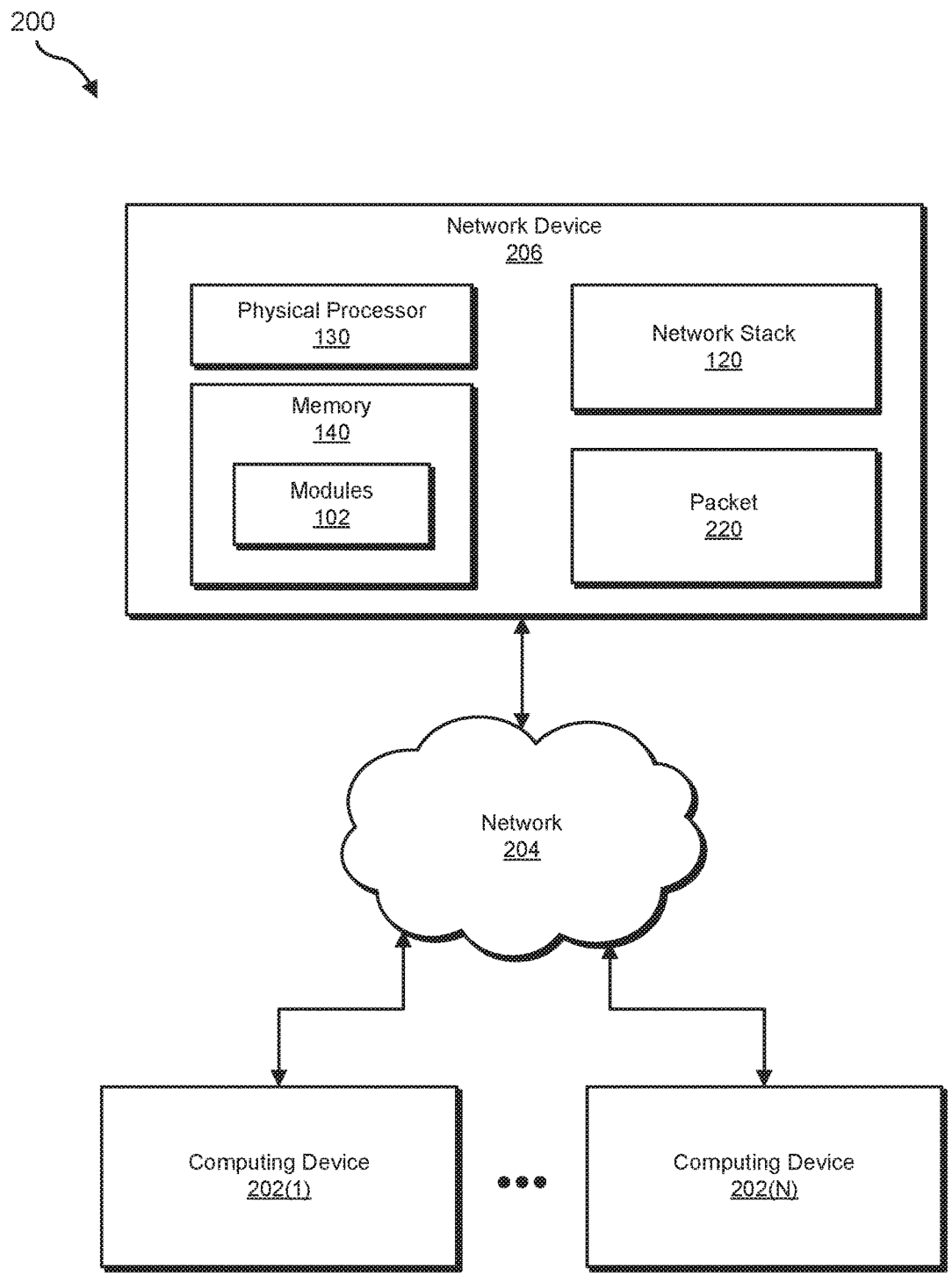
FIG. 2 is a block diagram of an exemplary system for supporting PMTU discovery by maintaining metadata integrity across proprietary and native network stacks within network devices.
Figure 3:
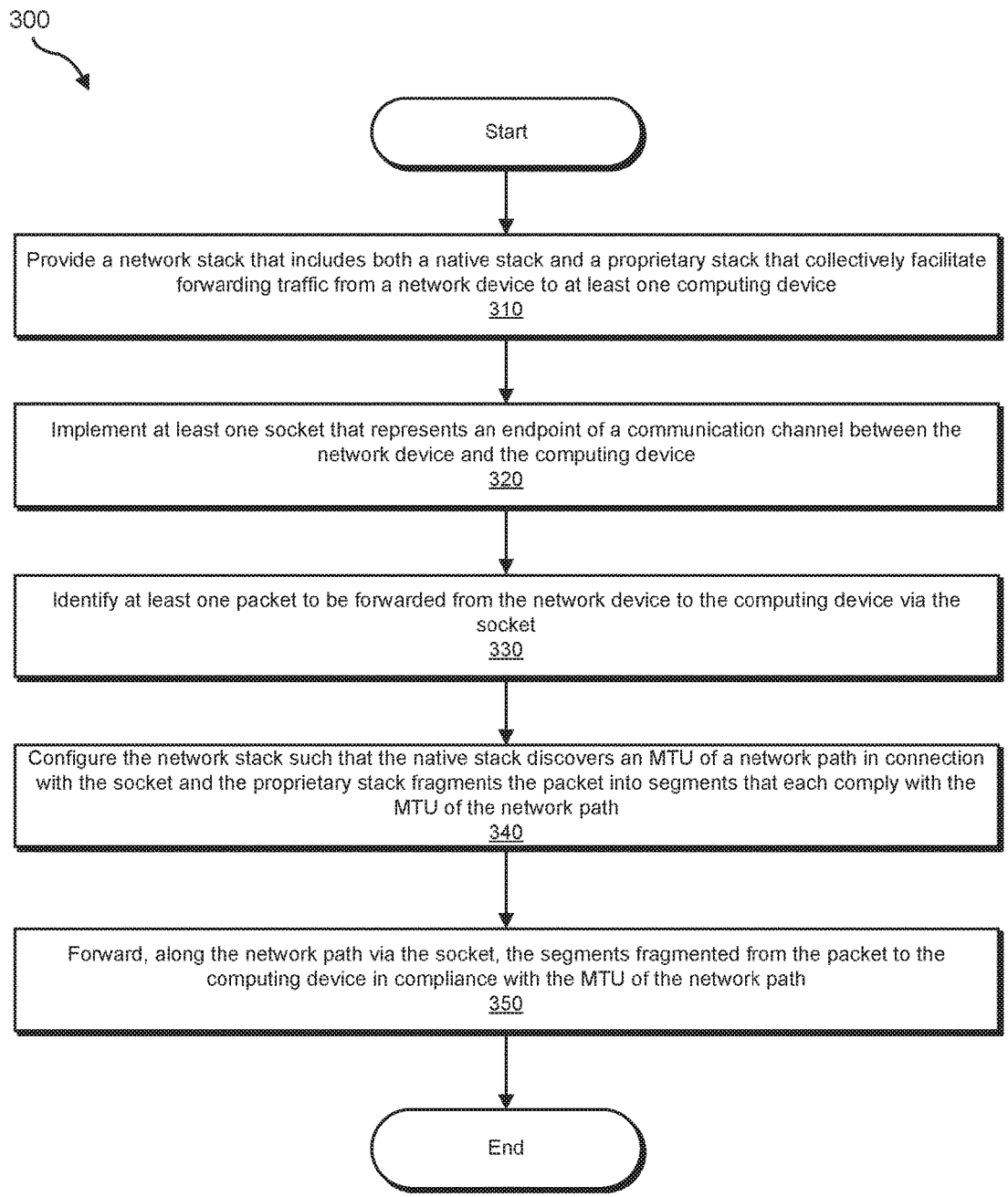
FIG. 3 is a flow diagram of an exemplary method for supporting PMTU discovery by maintaining metadata integrity across proprietary and native network stacks within network devices.
Figure 4:
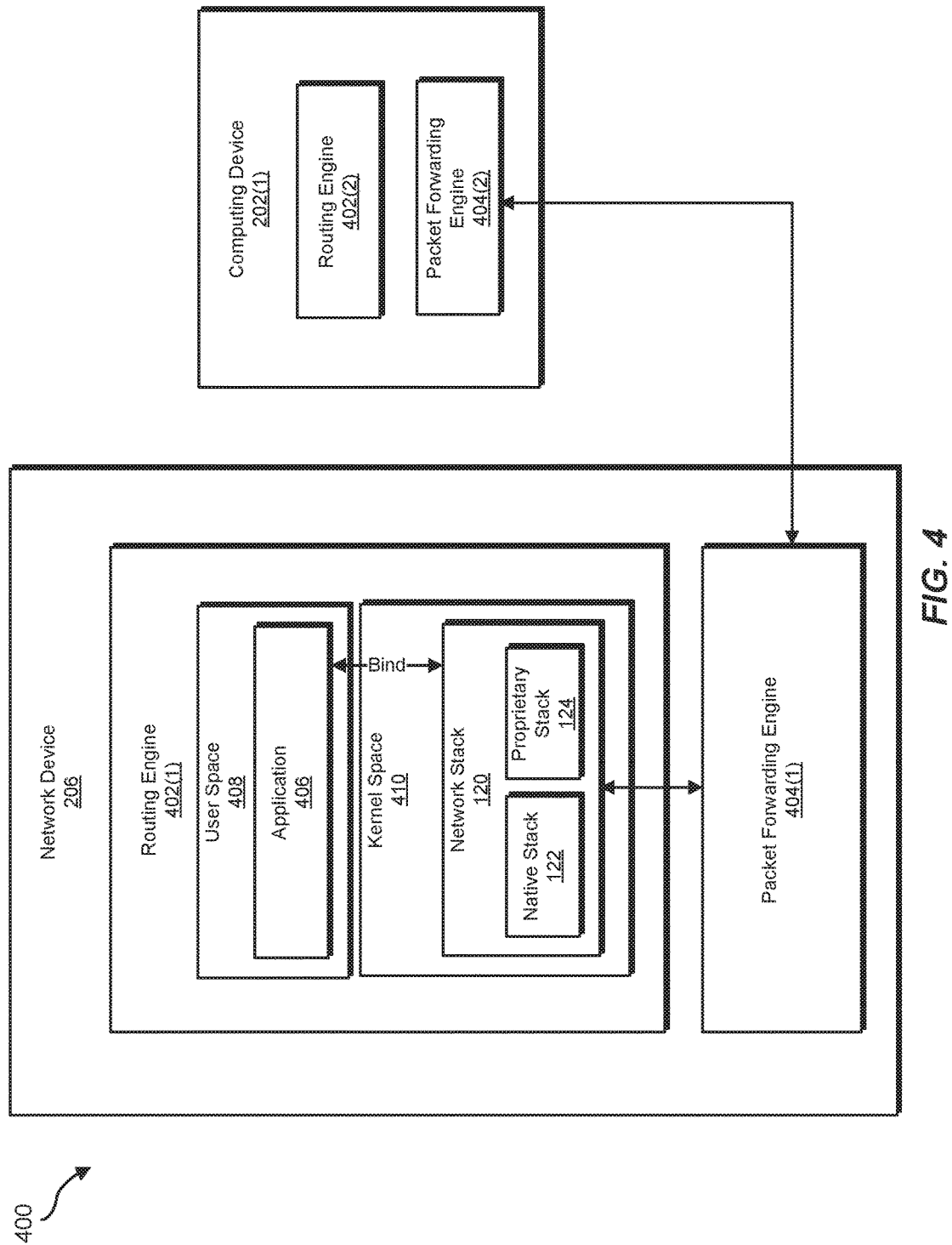
FIG. 4 is a block diagram of an exemplary implementation of a network device that maintains metadata integrity across propriety and native network stacks.

The following will provide, with reference to FIGS. 1, 2, and 4, detailed descriptions of exemplary systems for supporting PMTU discovery by maintaining metadata integrity across proprietary and native network stacks within network devices. Detailed descriptions of corresponding computer-implemented methods will be provided in connection with FIG. 3. Detailed descriptions of an exemplary timing diagram will be provided in connection with FIG. 5. Detailed descriptions of an exemplary database and an exemplary packet will be provided in connection with FIGS. 6 and 7, respectively. In addition, detailed descriptions of an exemplary computing system for carrying out these methods will be provided in connection with FIG. 8.

FIG. 1 is a block diagram of an exemplary system 100 for supporting PMTU discovery by maintaining metadata integrity across proprietary and native network stacks within network devices. As illustrated in this figure, exemplary system 100 may include one or more modules 102 for performing one or more tasks. As will be explained in greater detail below, modules 102 may include a provisioning module 104, a socket module 106, an identification module 108, a configuration module 110, a forwarding module 112, a blocking module 114, and a recording module 116. Although illustrated as separate elements, one or more of modules 102 in FIG. 1 may represent portions of a single module or application (such as an operating system, a network stack, a native stack, and/or a proprietary stack). Modules 102 may be stored and/or executed in kernel space and/or user space on a network device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 206 and/or computing devices 202(1)-(N)). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to maintain metadata integrity across proprietary and native network stacks within network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more network stacks, such as network stack 120. In some examples, network stack 120 may include and/or represent a portion of an operating system. For example, network stack 120 may include and/or represent a portion of a monolithic and/or open-source operating system that runs in kernel space on a network device. The term "monolithic operating system," as used herein, generally refers to an operating system that runs, operates, and/or is stored entirely within kernel space. In one example, the native components may derive and/or originate from a monolithic operating system, but additional proprietary components may span across and/or be shared by kernel space and user space. Examples of monolithic operating systems include, without limitation, LINUX operating systems, UNIX operating systems, Berkeley Software Distribution (BSD) operating systems (e.g., FREEBSD), OPENVMS operating systems, general-purpose operating systems, variations or combinations of one or more of the same, and/or any other suitable operating systems.

The term "open-source operating system," as used herein, generally refers to an operating system whose source code is modifiable, reprogrammable, and/or reconfigurable by third parties (such as equipment manufacturers, software vendors, and/or end-users). Examples of open-source operating systems include, without limitation, LINUX operating systems, UNIX operating systems, BSD operating systems (e.g., FREEBSD), OPENVMS operating systems, general-purpose operating systems, variations or combinations of one or more of the same, and/or any other suitable operating systems.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an operating system kernel and/or operating system components. In one example, user space and kernel space may include and/or represent mutually exclusive virtual memory allocations and/or execution contexts that are separate and/or segregated from one another.

As illustrated in FIG. 1, network stack 120 may include and/or represent a combination of both a native stack 122 and a proprietary stack 124. In one example, native stack 122 and proprietary stack 124 may collectively facilitate forwarding traffic from a network device to at least one remote device. In other words, network stack 120 may implement certain networking tasks and/or features (such as PMTU discovery, packet routing, transport-layer functions, PMTU compliance, and/or packet fragmentation), which are assigned across and/or shared by native stack 122 and proprietary stack 124.

In one example, native stack 122 may represent a portion of a monolithic open-source operating system. For example, native stack 122 may originate from a LINUX operating system running on a network device. In this example, proprietary stack 124 may be built on and/or over native stack 122. For example, proprietary stack 124 may be developed and/or built around native stack 122 by the manufacturer of the network device on which the LINUX operating system is running.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include a network device 206 in communication with computing devices 202(1)-(N) via a network 204. In one example, all or a portion of the functionality of modules 102 may be performed by network device 206, one or more of computing devices 202(1)-(N), and/or any other suitable computing system (whether or not illustrated in FIG. 2). As will be described in greater detail below, one or more of modules 102 from FIG. 1 may, when executed by at least one physical processor of network device 206 and/or computing devices 202(1)-(N), enable network device 206 and/or computing devices 202(1)-(N) to efficiently maintain metadata integrity across network stack 122 and proprietary stack 124.

For example, and as will be described in greater detail below, one or more of modules 102 may cause network device 206 to (1) provide network stack 120 that includes both native stack 122 and proprietary stack 124 that collectively facilitate forwarding traffic to one or more of computing devices 202(1)-(N), (2) implement at least one socket that represents an endpoint of a communication channel between network device 206 and the computing device, (3) identify packet 220 to be forwarded from network device 206 to the computing device via the socket, (4) configure network stack 120 such that (A) native stack 122 discovers a maximum transmission unit of a network path between network device 206 and the computing device in connection with the socket and (B) proprietary stack 124 fragments packet 220 into a plurality of segments that each comply with the maximum transmission unit of the network path, and then (5) forwarding, along the network path via the socket, the segments fragmented from packet 220 to the computing device in compliance with the maximum transmission unit of the network path.

Network device 206 generally represents any type or form of physical computing device that forwards traffic within a network and/or across networks. In one example, network device 206 may include and/or represent a router, such as a Customer Edge (CE) router, a Provider Edge (PE) router, a hub router, a spoke router, an Autonomous System (AS) boundary router, and/or an area border router. Additional examples of network device 206 include, without limitation, switches, hubs, modems, bridges, repeaters, gateways, network racks and/or chassis, portions of one or more of the same, combinations or variations of one or more of the same, and/or any other suitable network device. Although FIG. 2 illustrates only one labelled network device, other embodiments may involve and/or incorporate various additional network devices and/or computing devices.

Computing devices 202(1)-(N) each generally represent any type or form of physical computing device that forwards traffic within a network and/or across networks. In one example, computing devices 202(1)-(N) may each include and/or represent a router, such as a CE router, a PE router, a hub router, a spoke router, an AS boundary router, and/or an area border router. Additional examples of computing devices 202(1)-(N) include, without limitation, switches, hubs, modems, bridges, repeaters, gateways, network racks and/or chassis, laptops, tablets, desktops, servers, cellular phones, Personal Digital Assistants (PDAs), multimedia players, embedded systems, wearable devices (e.g., smart watches, smart glasses, etc.), gaming consoles, portions of one or more of the same, combinations or variations of one or more of the same, and/or any other suitable computing devices.

Network 204 generally represents any medium or architecture capable of facilitating communication or data transfer. In one example, network 204 may facilitate communication between network device 206 and computing devices 202(1)-(N). In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although network device 206 and computing devices 202(1)-(N) are illustrated as being external to network 204 in FIG. 2, these devices may alternatively represent part of and/or be included within network 204.

FIG. 3 is a flow diagram of an exemplary computer-implemented method 300 for supporting PMTU discovery by maintaining metadata integrity across proprietary and native network stacks within network devices. The steps shown in FIG. 3 may be performed by any suitable computer-executable code, computing system, and/or ASIC, including system 100 in FIG. 1, system 200 in FIG. 2, network device 206 in FIGS. 2 and 4, routing engine 402(1) in FIG. 4, packet forwarding engine 404(1) in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may provide a network stack that includes both a native stack and a proprietary stack that collectively facilitate forwarding traffic from a network device to at least one computing device. For example, provisioning module 104 may, as part of network device 206 in FIG. 2 or 4, provide network stack 120 that includes both native stack 122 and proprietary stack 124. In this example, native stack 122 and proprietary stack 124 may collectively facilitate forwarding traffic from network device 206 to one or more of computing devices 202(1)-(N) via network 204.

The systems described herein may perform step 310 in a variety of different ways and/or contexts. In some examples, provisioning module 104 may provide network stack 120 as part of a monolithic open-source operating system that is deployed and/or running on network device 206. For example, the manufacturer of network device 206 may use a LINUX operating system kernel. In this example, the LINUX operating system kernel may include native stack 122 from the outset. In other words, native stack 122 may represent a portion of the LINUX operating system kernel.

Continuing with this example, the manufacturer may develop proprietary stack 124 and then add the same to the LINUX operating system kernel. The manufacturer may essentially build proprietary stack 124 on top of native stack 122. In one example, the manufacturer and/or provisioning module 104 may program and/or configure network stack 120 to divvy up certain networking tasks (e.g., IPv6 PMTU discovery, packet routing, transport-layer functions, PMTU compliance, and/or packet fragmentation) between native stack 122 and proprietary stack 124. In this example, traffic egressing from network device 206 may pass back and forth between native stack 122 and proprietary stack 124 to fulfill all the networking tasks necessary to properly route and/or forward the traffic to the intended destination.

In one example, provisioning module 104 may provide network stack 120 by installing network stack 120 on network device 206. Additionally or alternatively, provisioning module 104 may provide network stack 120 by executing network stack 120 on network device 206. As a further example, provisioning module 104 may provide network stack 120 by managing traffic flowing through network device 206 via network stack 120.

Returning to FIG. 3, at step 320 one or more of the systems described herein may implement at least one socket that represents an endpoint of a communication channel between the network device and the computing device. For example, socket module 106 may, as part of network device 206 in FIG. 2 or 4, implement a socket that represents one endpoint of a communication channel between network device 206 and one or more of computing devices 202(1)-(N). The term "socket," as used herein, generally refers to any endpoint of a communication channel between multiple computing devices. Accordingly, this socket may include and/or represent one endpoint of a two-way communication link between applications running on different devices.

The systems described herein may perform step 320 in a variety of different ways and/or contexts. For example, socket module 106 may receive a socket call from an application running in user space on network device 206. In this example, the socket call may direct, prompt, and/or cause socket module 106 to open and/or create a socket between the application running in user space on network device 206 and another application running on computing device 202(1). Accordingly, socket module 106 may open and/or create the socket in response to the socket call received from the application running in user space on network device 206.

For example, an application running in user space on network device 206 may issue a socket call to create a socket that represents one side of a communication channel between the network device 206 and computing device 202(1). Additionally or alternatively, an application running on computing device 202(1) may issue a socket call to create a socket that represents the other side of the communication channel between network device 206 and computing device 202(1). Examples of such socket calls include, without limitation, a socket system call (e.g., socket( )), a connect system call (e.g., connect( )), a read system call (e.g., read( )), a write system call (e.g., write( )), a bind system call (e.g., bind ( )), a listen system call (e.g., listen( )), an accept system call (e.g., accept( )), variations of one or more of the same, combinations of one or more of the same, and/or any other suitable socket calls.

Returning to FIG. 3, at step 330 one or more of the systems described herein may identify at least one packet to be forwarded from the network device to the computing device via the socket. For example, identification module 108 may, as part of network device 206 in FIG. 2 or 4, identify packet 220 to be forwarded from network device 206 to one of computing devices 202(1)-(N) via the socket. In this example, packet 220 may have originated from the application to which the socket is bound. In other words, the same application that initiated the creation of the socket may also send out packet 220.

The systems described herein may perform step 330 in a variety of different ways and/or contexts. In some examples, identification module 108 may identify packet 220 upon receiving packet 220 from the application running in user space on network device 206. For example, the application may initiate communication with computing device 202(1) by creating some packets and then sending the same to kernel space on network device 206. As the packets arrive in kernel space, identification module 108 may identify the packets and/or direct the packets to network stack 120 for processing.

Returning to FIG. 3, at step 340 one or more of the systems described herein may configure the network stack such that (1) the native stack discovers a Maximum Transmission Unit (MTU) of a network path in connection with the socket and (2) the proprietary stack fragments the packet into segments that each comply with the MTU of the network path. For example, configuration module 110 may, as part of network device 206 in FIG. 2 or 4, configure network stack 120 such that native stack 122 discovers the MTU of the network path in connection with the socket. In other words, under this configuration, native stack 122 may be responsible for the IPv6 PMTU discovery for the packet.

In this example, configuration module 110 may also configure network stack 120 such that proprietary stack 124 fragments the packet into segments that each comply with the MTU of the network path. In other words, under this configuration, proprietary stack 124 may be responsible for fragmenting the packet in the event that the size of the packet exceeds the MTU of the network path to be traversed by the packet. The network path may include and/or represent any series of one or more communication links that connect network device 206 with computing devices 202(1)-(N). The term "maximum transmission unit" and the abbreviation "MTU," as used herein, generally refer to the size of the largest packet capable of being transmitted via a certain interface and/or network path.

The systems described herein may perform step 340 in a variety of different ways and/or contexts. In some examples, configuration module 110 may configure network stack 120 by extending and/or incorporating at least a portion of network stack 120 (such as native stack 122 and/or proprietary stack 124). In one example, configuration module 110 may divvy up certain networking tasks between native stack 122 and proprietary stack 124. For example, configuration module 110 may assign IPv6 PMTU discovery and transport functions to native stack 122. In this example, configuration module 110 may also assign packet routing, packet fragmentation, and PMTU compliance to proprietary stack 124. In other words, configuration module 110 may configure network stack 120 such that (1) native stack 122 is responsible for IPv6 PMTU discovery and transport functions and (2) proprietary stack 124 is responsible for packet routing, packet fragmentation, and PMTU compliance.

In some examples, configuration module 110 may build proprietary stack 124 on and/or over native stack 122. In such examples, native stack 122 may originate from and/or represent a portion of a monolithic open-source operating system running on network device 206. Proprietary stack 124 may originate from the manufacturer of network device 206 and/or represent an addition to and/or extension of native stack 122. Proprietary stack 124 may provide and/or facilitate certain new features and/or capabilities beyond those provided and/or facilitated by native stack 122.

In one example, configuration module 110 may set the MTU discovery mode of the packet's socket to a probe state. For example, a LINUX operating system running on network device 206 may provide a socket option called "IPV6_MTU_DISCOVER". This "IPV6_MTU_DISCOVER" socket option may enable applications running in user space on network device 206 to set the discovery mode for their sockets to "DO", "DONT", "PROBE", and/or "WANT". In this example, configuration module 110 may receive a request from the application to set the discovery mode of the corresponding socket to "PROBE". This "PROBE" mode may enable applications (such as TRACEPATH) to discover the PMTU of their sockets themselves using certain probing mechanisms.

In one example, when the socket's PMTU discovery mode is set to the probe state, native stack 122 may discover the socket's PMTU but be prevented from fragmenting the packet into segments. In other words, the probe state of the PMTU discovery mode may effectively cause native stack 122 to discover the PMTU of the socket and prevent native stack 122 from fragmenting the packet into PMTU-compliant segments even in the event that the size of the packet exceeds the PMTU. Accordingly, the probe state of the PMTU discovery mode may cause native stack 122 to pass and/or forward the packet to proprietary stack 124 without fragmenting the packet such that the packet arrives at proprietary stack 124 with the metadata intact.

In some examples, identification module 108 may intercept a request from the application running in user space to set the PMTU discovery mode of the socket to the probe state. In such examples, blocking module 114 and/or configuration module 110 may block and/or prevent the request to set the PMTU discovery mode of the socket from ever reaching native stack 122. In one example, recording module 116 may store a record of the requested PMTU discovery mode in a database of network stack 120. This record may include and/or represent a database entry indicating that the PMTU discovery mode of the socket is set to the probe state.

Figure 6:
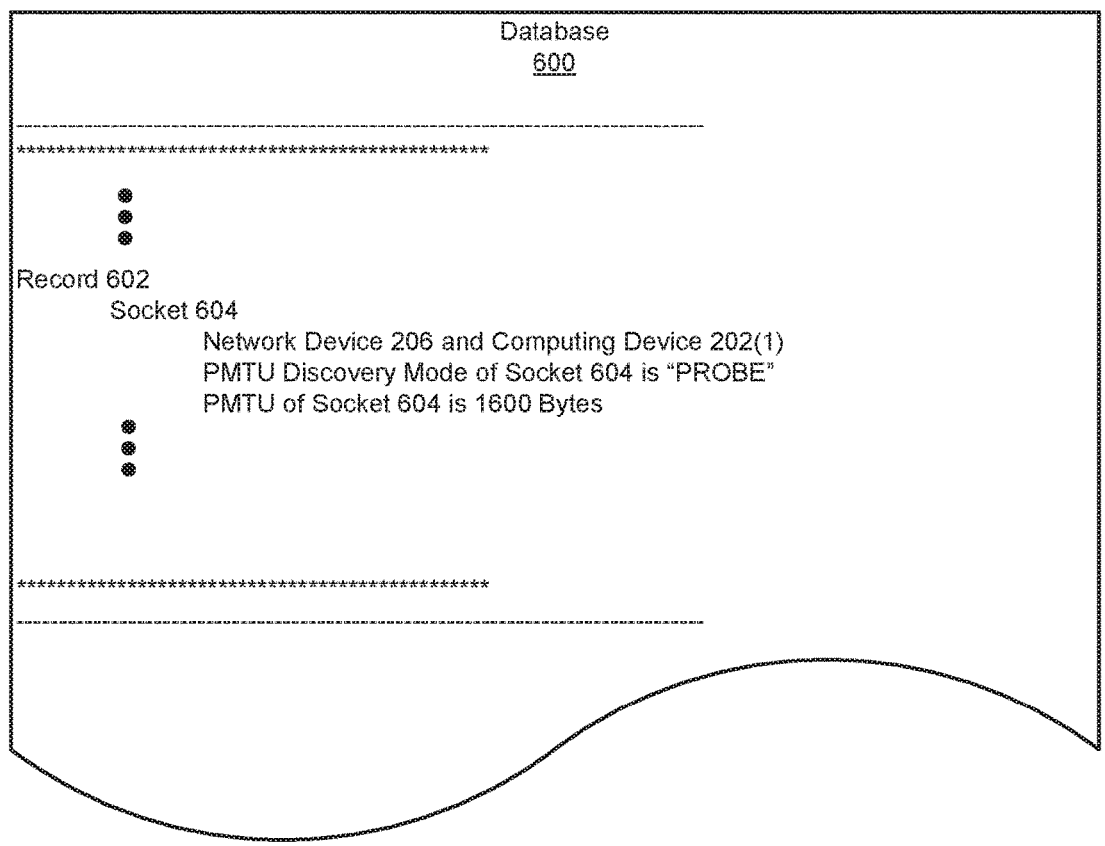
FIG. 6 is an illustration of an exemplary database that includes a record corresponding to a certain socket.

FIG. 6 illustrates an exemplary portion of database 600 that includes a record 602 for a socket 604. As illustrated in FIG. 6, record 602 may include and/or represent an entry indicating that socket 604 corresponds to a communication link between network device 206 and computing device 202. In addition, record 602 may indicate that socket 604 is set to the "PROBE" PMTU discovery mode. Record 602 may also identify socket 604 as having a PMTU of 1600 bytes.

In one example, recording module 116 may copy at least a portion of the record into a control message header (e.g., "CMSG") of the packet before the packet arrives at proprietary stack 124 for fragmentation and/or PMTU compliance. In this example, the control message header of the packet may include information that identifies the socket's PMTU discovery mode as being in the probe state. Once that information has been copied to the control message header of the packet, forwarding module 112 may pass and/or forward the packet to proprietary stack 124 for fragmentation and/or PMTU compliance prior to being forwarded to one or more of computing devices 202(1)-(N).

In some examples, configuration module 110 may automatically set the PMTU mode of each socket on network device 206 to the probe state. By doing so, native stack 122 may be responsible for discovering the PMTU for each socket on network device 206, and proprietary stack 124 may be responsible for enforcing PMTU compliance on the packets and/or fragmenting the packets bound to one of the sockets into PMTU-compliant segments.

In some examples, native stack 122 may perform the PMTU discovery for the socket to which a certain packet is bound. In such examples, native stack 122 may store and/or maintain the discovered PMTU value in a local database. Forwarding module 112 may pass and/or forward the packet to proprietary stack 124 for fragmentation and/or PMTU compliance prior to egressing from network device 206 toward the packet's destination.

In some examples, identification module 108 may receive the packet from native stack 122 at proprietary stack 124. In other words, the packet may traverse from native stack 122 to proprietary stack 124. In one example, proprietary stack 124 may obtain and/or determine the PMTU value discovered by native stack 122 from the local database of native stack 122. For example, proprietary stack 124 may perform a lookup operation on the local database of native stack 122 to identify the PMTU value discovered by native stack 122. At proprietary stack 124, identification module 108 may analyze the metadata of the packet to determine the MTU of the network path corresponding to the packet and the MTU discovery mode of the packet's socket. In this example, identification module 108 may compare the size of the packet itself with the MTU of the network path and then determine, based at least in part on this comparison, that the size of the packet exceeds the MTU of the network path. In response to this determination, proprietary stack 124 may fragment the packet into multiple segments that each comply with the MTU of the network path.

In some examples, identification module 108 may receive, at proprietary stack 124, other packets to be forwarded from network device 206 to one or more of computing devices 202(1)-(N) via network 204. At proprietary stack 124, identification module 108 may analyze the metadata of those packets to determine the MTU of the network path(s) corresponding to those packets and the MTU discovery mode of the socket(s) of those packets. In this example, identification module 108 may compare the size of each packet with the MTU of the corresponding network path and then determine, based at least in part on this comparison, whether the size of each packet exceeds the MTU of the corresponding network path.

In one example, identification module 108 may determine that the size of at least one of the packets complies with and does not exceed the corresponding MTU. In response to this determination, proprietary stack 124 may forward the packet to one or more of computing devices 202(1)-(N) along the corresponding network path without fragmenting the packet into smaller segments. Alternatively, proprietary stack 124 may allow the packet to be forwarded to one or more of computing devices 202(1)-(N) along the corresponding network path without fragmenting the packet into smaller segments.

FIG. 4 illustrates an exemplary implementation 400 of network device 206 and computing device 202(1). In this example, network device 206 may maintain and/or facilitate metadata integrity across propriety stack 124 and native stack 122. As illustrated in FIG. 4, network device 206 may include a routing engine 402(1) and a packet forwarding engine 404(1) in communication with one another. Similarly, network device 206 may include a routing engine 402(2) and a packet forwarding engine 404(2) in communication with one another.

Routing engines 402(1) and 402(2) each generally represent and/or refer to a physical device and/or hardware that handles routing procedures, processes, and/or decisions. Routing engines 402(1) and 402(2) may each include one or more ASICs and/or physical processors. Packet forwarding engines 404(1) and 404(2) each generally represent and/or refer to a physical device and/or hardware that forwards packets to remote computing devices. Packet forwarding engines 404(1) and 404(2) may each include one or more ASICs and/or physical processors.

As illustrated in FIG. 4, an application 406 in user space 408 on network device 206 may bind to network stack 120 (or proprietary stack 124) in kernel space 410 on network device 206. By binding to network device 120 (or proprietary stack 124) in this way, application 406 may open and/or create a socket that facilitates communication between application 406 and another application on network device 206. Upon the opening and/or creation of the socket, application 406 may generate a packet and then send the same from user space 408 to kernel space 410. In other words, application 406 may push and/or pass the packet to an operating system kernel on routing engine 402(1) for transmission from network device 206 to computing device 202(1). In this example, the packet may be destined for the other application on computing device 202(1).

In one example, after the packet has arrived at network stack 120, native stack 122 and proprietary stack 124 may collectively route and/or process the packet. This processing may involve enforcing PMTU compliance on the packet and/or fragmenting the packet into PMTU-compliant segments if necessary. Upon completion of such routing and/or processing, network stack 120 may push and/or pass the packet from routing engine 402(1) to packet forwarding engine 404(1) on the way to computing device 202(1). In turn, packet forwarding engine 404(1) may forward the packet to computing device 202(1) via the network path corresponding to the packet.

Although illustrated as being contained entirely within kernel space 410 in FIG. 4, proprietary stack 124 may span across and/or be shared by kernel space 410 and user space 408. For example, the portion of proprietary stack 124 that is dedicated to packet routing may be located and/or executed in user space 408, as opposed to kernel space 410.

Figure 5:
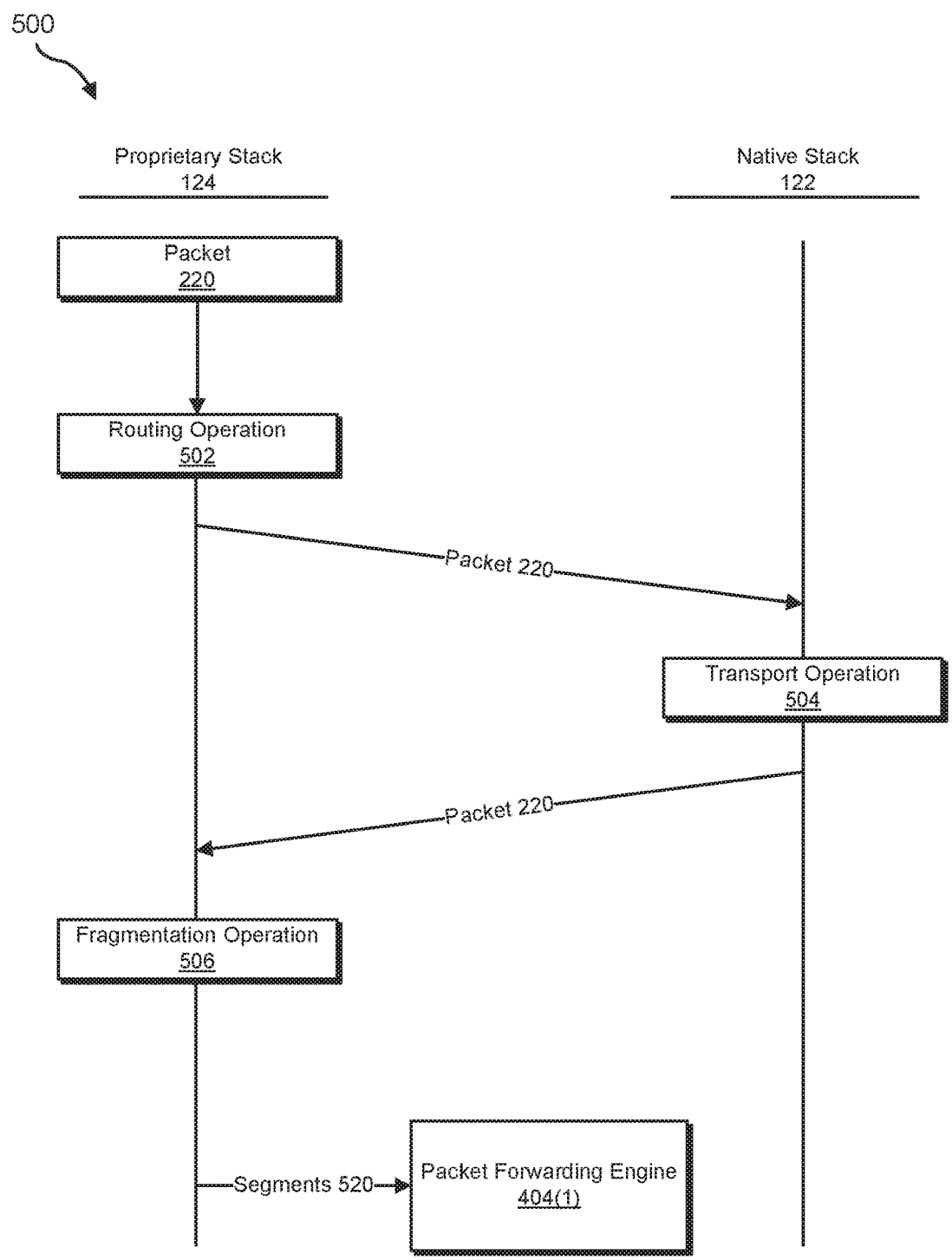
FIG. 5 is a timing diagram of an exemplary method for supporting PMTU discovery by maintaining metadata integrity across proprietary and native network stacks within network devices.

FIG. 5 illustrates an exemplary timing diagram 500 of an exemplary method for maintaining metadata integrity across proprietary stack 124 and native stack 122 within network device 206. As illustrated in timing diagram 500, packet 220 may arrive at proprietary stack 124. After the packet's arrival, proprietary stack 124 may perform a routing operation 502 on packet 220 to identify the route and/or network path along which the packet is to traverse to reach its destination. Proprietary stack 124 may store certain routing information in the metadata of packet 220. Upon completion of the routing operation 502, proprietary stack 124 may pass and/or forward packet 220 to native stack 122 for further processing.

After the packet's arrival, native stack 122 may perform a transport operation 504 on packet 220 to process the packet with respect to the transport layer and/or Layer 4 of the Open Systems Interconnection (OSI) model. Such processing may fulfill the packet's needs for User Datagram Protocol (UDP) and/or Transmission Control Protocol (TCP) transport or forwarding. Native stack 122 may also perform IPv6 PMTU discovery for the packet. Native stack 122 may store certain transport and/or PMTU discovery information in the metadata of packet 220. Upon completion of routing operation 502 and/or IPv6 PMTU discovery, proprietary stack 124 may pass and/or forward packet 220 back to native stack 122 for further processing.

After the packet's return, proprietary stack 124 may perform a fragmentation operation 506 on packet 220 in the event that the size of packet 220 exceeds the PMTU value of the corresponding socket. In this example, fragmentation operation 506 may involve fragmenting and/or dividing packet 220 into smaller segments 520 that each comply with the PMTU value of the corresponding socket. Upon completion of fragmentation operation 506, proprietary stack 124 may pass and/or forward segments 520 to packet forwarding engine 404(1).

Figure 7:
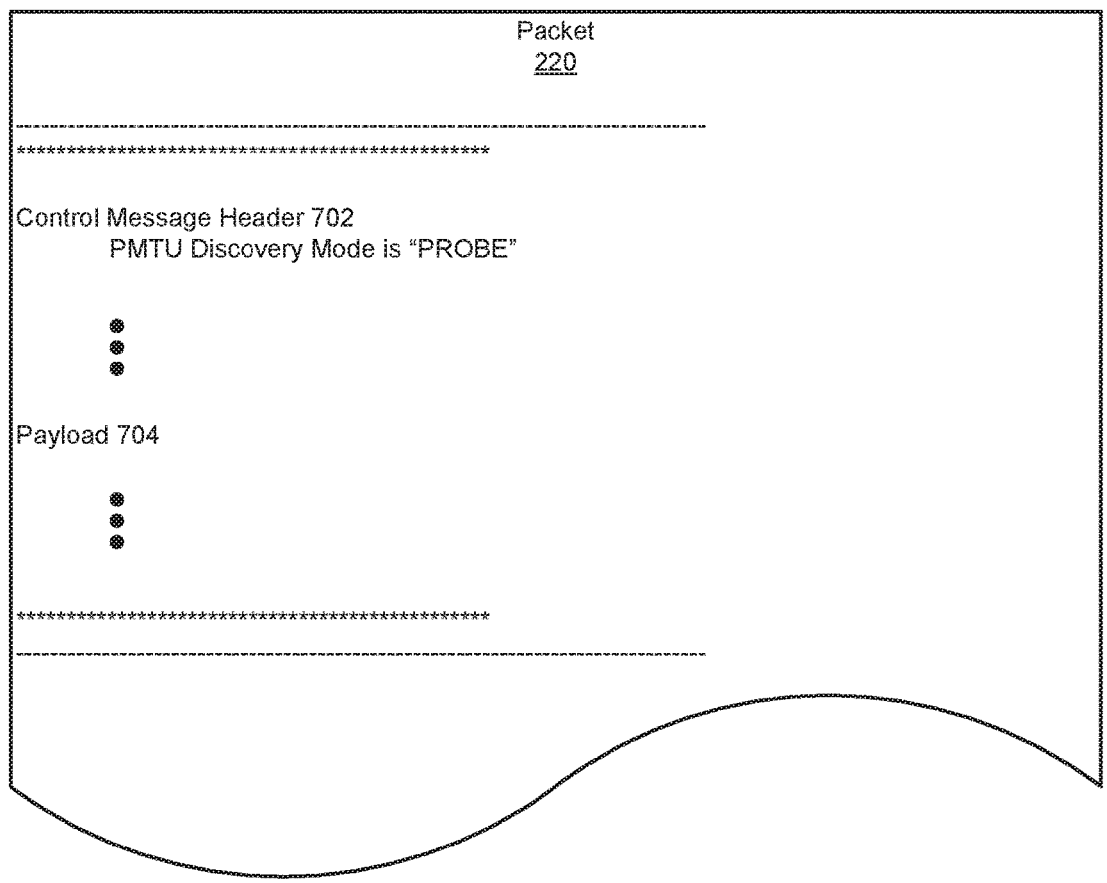
FIG. 7 is an illustration of an exemplary packet that traverses a network stack on the way to a remote computing device.

FIG. 7 illustrates an exemplary representation of packet 220 that traverses network stack 120. As illustrated in FIG. 7, packet 220 may include a control message header 702 and a payload 704. In this example, control message header 702 may indicate that the PMTU discovery mode of the corresponding socket is set to "PROBE".

Figure 8:
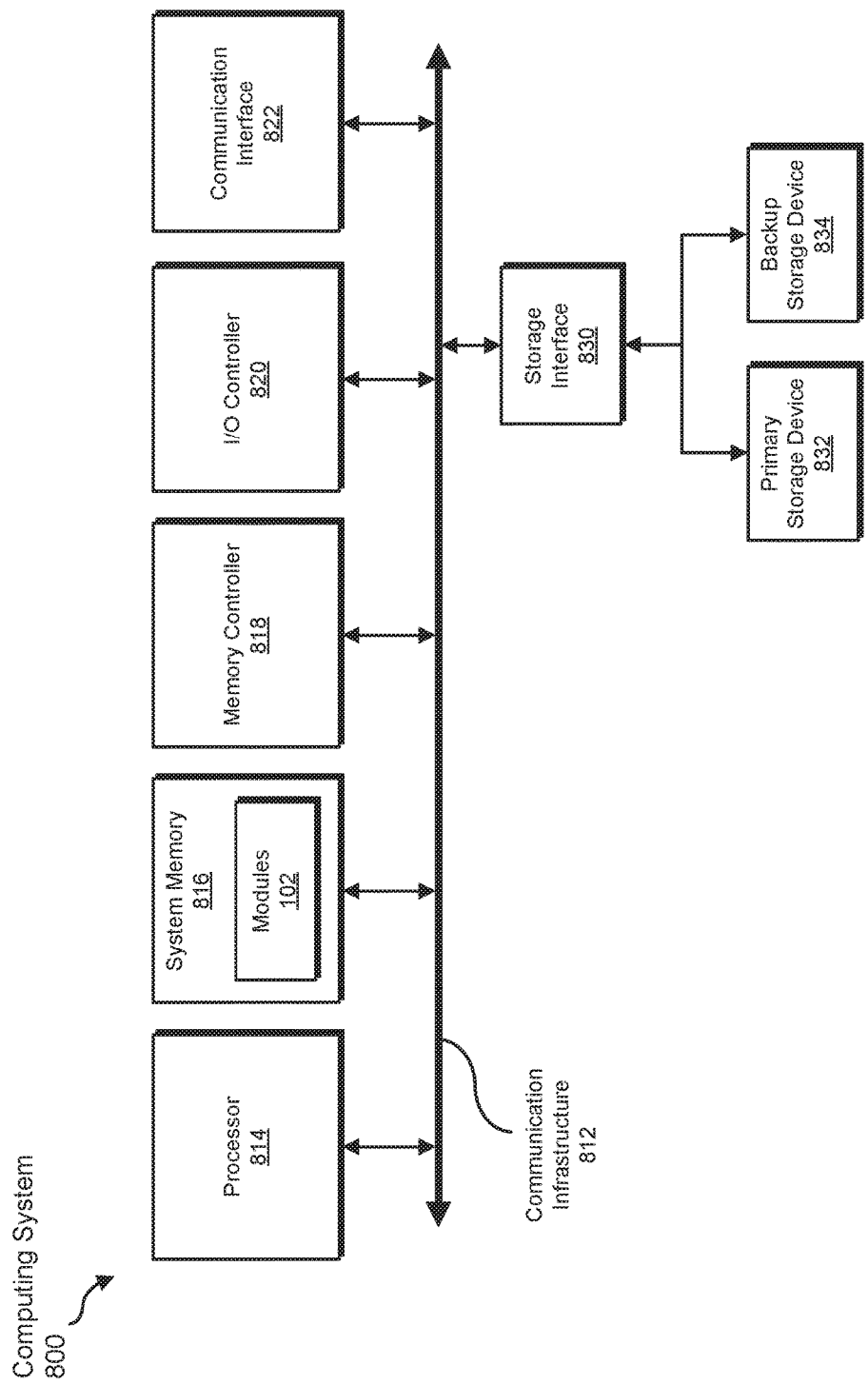
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein. In one example, computing system 800 may include, represent, and/or implement exemplary system 100 from FIG. 1.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the OSI reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general-purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
providing a network stack that includes both a native stack and a proprietary stack that collectively facilitate forwarding traffic from a network device to at least one computing device;
implementing at least one socket that represents an endpoint of a communication channel between the network device and the computing device;
identifying at least one packet to be forwarded from the network device to the computing device via the socket;
configuring the network stack such that:
the native stack discovers a maximum transmission unit of a network path between the network device and the computing device in connection with the socket; and
the proprietary stack fragments the packet into a plurality of segments that each comply with the maximum transmission unit of the network path;
setting a maximum-transmission-unit discovery mode of the socket to a probe state, wherein the maximum-transmission-unit discovery mode of the socket:
causes the native stack to discover the maximum transmission unit of the network path in connection with the socket; and
prevents the native stack from fragmenting the packet into the plurality of segments; and
forwarding, along the network path via the socket, the segments fragmented from the packet to the computing device in compliance with the maximum transmission unit of the network path.

2. The method of claim 1, wherein:
identifying the packet comprises receiving, at the native stack, the packet with metadata intact; and
the maximum-transmission-unit discovery mode of the socket causes the native stack to pass the packet to the proprietary stack without fragmenting the packet such that the packet arrives at the proprietary stack with the metadata intact.

3. The method of claim 1, wherein:
identifying the packet comprises receiving the packet from an application running in user space on the network device; and
further comprising:
intercepting a request from the application to set the maximum-transmission-unit discovery mode of the socket to the probe state;
preventing the request to set the maximum-transmission-unit discovery mode of the socket from reaching the native stack; and
storing, in a database of the network stack, a record indicating that the maximum-transmission-unit discovery mode of the socket is set to the probe state.

4. The method of claim 3, further comprising:
copying, into a control message header of the packet before the packet arrives at the proprietary stack, at least a portion of the record to indicate that the maximum-transmission-unit discovery mode of the socket is set to the probe state; and
after having copied the portion of the record into the control message header of the packet, passing the packet to the proprietary stack for fragmentation prior to being forwarded to the computing device.

5. The method of claim 1, further comprising automatically setting a maximum-transmission-unit discovery mode of each socket on the network device to the probe state such that:
the native stack discovers a maximum transmission unit for each socket on the network device; and
the proprietary stack fragments packets bound to a socket into segments that each comply with the maximum transmission unit of the socket.

6. The method of claim 1, further comprising:
storing the maximum transmission unit of the network path in a database at the native stack; and
passing the packet to the proprietary stack for fragmentation prior to being forwarded to the computing device.

7. The method of claim 1, further comprising:
receiving, at the proprietary stack, the packet from the native stack;
determining, based at least in part on metadata of the packet, the maximum transmission unit of the network path and the maximum-transmission-unit discovery mode of the socket;
determining, by comparing a size of the packet with the maximum transmission unit of the network path, that the size of the packet exceeds the maximum transmission unit of the network path; and
wherein fragmenting the packet into the plurality of segments comprises fragmenting the packet into the plurality of segments in response to determining that the size of the packet exceeds the maximum transmission unit of the network path.

8. The method of claim 1, further comprising
identifying at least one additional packet to be forwarded from the network device to the computing device via the socket;
determining, by comparing a size of the additional packet with the maximum transmission unit of the network path, that the size of the additional packet complies with the maximum transmission unit of the network path; and
in response to determining that the size of the additional packet complies with the maximum transmission unit of the network path, forwarding the additional packet to the computing device along the network path via the socket without fragmenting the additional packet.

9. The method of claim 1, wherein:
performing, at the proprietary stack, at least one routing operation for the packet;
passing the packet from the proprietary stack to the native stack for at least one transport operation;
performing, at the native stack, the transport operation for the packet; and
returning the packet to the proprietary stack for fragmentation prior to being forwarded to the computing device.

10. The method of claim 1, wherein:
the native stack represents at least a portion of a monolithic open-source operating system; and
the proprietary stack is built on the native stack.

11. A system comprising:
a provisioning module, stored in memory, that provides a network stack that includes both a native stack and a proprietary stack that collectively facilitate forwarding traffic from a network device to at least one computing device;
a socket module, stored in memory, that implements at least one socket that represents an endpoint of a communication channel between the network device and the computing device;
an identification module, stored in memory, that identifies at least one packet to be forwarded from the network device to the computing device via the socket;
a configuration module, stored in memory, that:
configures the network stack such that:
the native stack discovers a maximum transmission unit of a network path between the network device and the computing device in connection with the socket; and
the proprietary stack fragments the packet into a plurality of segments that each comply with the maximum transmission unit of the network path; and
sets a maximum-transmission-unit discovery mode of the socket to a probe state, wherein the maximum-transmission-unit discovery mode of the socket:
causes the native stack to discover the maximum transmission unit of the network path in connection with the socket; and
prevents the native stack from fragmenting the packet into the plurality of segments;
a forwarding module, stored in memory, that forwards, along the network path via the socket, the segments fragmented from the packet to the computing device in compliance with the maximum transmission unit of the network path; and
at least one physical processing device that executes the provisioning module, the socket module, the identification module, the configuration module, and the forwarding module.

12. The system of claim 11, wherein:
the identification module receives, at the native stack, the packet with metadata intact; and
the maximum-transmission-unit discovery mode of the socket causes the native stack to pass the packet to the proprietary stack without fragmenting the packet such that the packet arrives at the proprietary stack with the metadata intact.

13. The system of claim 11, wherein:
the identification module:
receives the packet from an application running in user space on the network device; and
intercept a request from the application to set the maximum-transmission-unit discovery mode of the socket to the probe state;
further comprising:
a blocking module, stored in memory, that prevents the request to set the maximum-transmission-unit discovery mode of the socket from reaching the native stack; and
a recording module, stored in memory, that stores, in a database of the network stack, a record indicating that the maximum-transmission-unit discovery mode of the socket is set to the probe state.

14. The system of claim 13, wherein:
the recording module copies, into a control message header of the packet before the packet arrives at the proprietary stack, at least a portion of the record to indicate that the maximum-transmission-unit discovery mode of the socket is set to the probe state; and
the forwarding module passes the packet to the proprietary stack for fragmentation prior to being forwarded to the computing device.

15. The system of claim 11, wherein the configuration module automatically sets a maximum-transmission-unit discovery mode of each socket on the network device to the probe state such that:
the native stack discovers a maximum transmission unit for each socket on the network device; and
the proprietary stack fragments packets bound to a socket into segments that each comply with the maximum transmission unit of the socket.

16. A network device comprising:
a storage device that stores a network stack that includes both a native stack and a proprietary stack that collectively facilitate forwarding traffic to at least one computing device; and
at least one physical processing device that is communicatively coupled to the storage device, wherein the physical processing device:
implements at least one socket that represents an endpoint of a communication channel to the computing device;
identifies at least one packet to be forwarded to the computing device via the socket;
configures the network stack such that:
the native stack discovers a maximum transmission unit of a network path to the computing device in connection with the socket; and
the proprietary stack fragments the packet into a plurality of segments that each comply with the maximum transmission unit of the network path;
sets a maximum-transmission-unit discovery mode of the socket to a probe state, wherein the maximum-transmission-unit discovery mode of the socket:
causes the native stack to discover the maximum transmission unit of the network path in connection with the socket; and
prevents the native stack from fragmenting the packet into the plurality of segments; and
forwards, along the network path via the socket, the segments fragmented from the packet to the computing device in compliance with the maximum transmission unit of the network path.

* * * * *